United States Patent
Nokkonen et al.

(10) Patent No.: US 6,850,738 B2
(45) Date of Patent: Feb. 1, 2005

(54) METHOD AND ANTENNA ARRANGEMENT FOR COUPLING EXTERNAL ANTENNAS TO A COMMUNICATION UNIT

(75) Inventors: Urpo Nokkonen, Tampere (FI); Olli Talvitie, Tampere (FI); Olli-Pekka Lundén, Suinula (FI)

(73) Assignee: Nokia Mobile Phones, Ltd., Espoo (FI)

( * ) Notice: Subject to any disclaimer, the term of this patent is extended or adjusted under 35 U.S.C. 154(b) by 500 days.

(21) Appl. No.: 09/725,793

(22) Filed: Nov. 29, 2000

(65) Prior Publication Data

US 2001/0041541 A1 Nov. 15, 2001

(30) Foreign Application Priority Data

Nov. 30, 1999 (FI) .............................................. 19992563

(51) Int. Cl.[7] .................................................. H04B 1/44
(52) U.S. Cl. ..................... 455/83; 455/101; 455/103; 455/552.1; 455/562.1; 455/63.4; 455/575.7; 455/63.3; 343/702; 343/895; 343/725; 342/448
(58) Field of Search ................................ 455/83, 552.1, 455/562.1, 63.3, 63.4, 101, 103, 553.1, 512.1, 97, 554.2, 127.4; 343/702, 700, 895, 846, 725; 342/457

(56) References Cited

U.S. PATENT DOCUMENTS

| | | | | |
|---|---|---|---|---|
| 3,739,390 A | | 6/1973 | Poppe, Jr. et al. .......... 343/729 |
| 5,551,080 A | * | 8/1996 | Chambers et al. .......... 455/348 |
| 5,619,213 A | * | 4/1997 | Hays, III ..................... 343/703 |
| 5,650,792 A | | 7/1997 | Moore et al. ................ 343/725 |
| 5,734,352 A | | 3/1998 | Seward et al. ............... 343/722 |
| 5,812,098 A | * | 9/1998 | Harris et al. ................. 343/906 |
| 5,881,369 A | * | 3/1999 | Dean et al. ................... 455/78 |
| 5,997,314 A | * | 12/1999 | Wallace et al. ............... 439/63 |
| 6,072,993 A | * | 6/2000 | Trikha et al. .................. 455/78 |
| 6,100,847 A | * | 8/2000 | Sointula ....................... 343/702 |
| 6,133,884 A | * | 10/2000 | Talvitie et al. .............. 343/702 |
| 6,140,966 A | * | 10/2000 | Pankinaho ........... 343/700 MS |
| 6,449,499 B1 | * | 9/2002 | Ishikura et al. ............. 455/571 |
| 6,473,603 B1 | * | 10/2002 | Toncich et al. .......... 455/226.1 |

FOREIGN PATENT DOCUMENTS

| | | |
|---|---|---|
| DE | 3826777 A1 | 2/1990 |
| EP | 0767508 A3 | 4/1997 |
| EP | 0 833 455 A2 | 4/1998 |
| EP | 0 862 278 A2 | 9/1998 |
| WO | WO 98/10485 | 3/1998 |
| WO | WO 99/08395 | 2/1999 |

OTHER PUBLICATIONS

Japanese Patent Document No. JP 11112373—Abstract only.

* cited by examiner

Primary Examiner—Marceau Milord
(74) Attorney, Agent, or Firm—Perman & Green, LLP

(57) ABSTRACT

An arrangement for coupling external antennas (14, 15) to a communication unit (20) comprises, for example, a first filter (25) located in the unit, which filter combines at least signals of a first frequency range and signals of at least a second frequency range to be transmitted and feeds them via a common coupling (29, 26) to external antennas (14, 15), filters the received first signals to a first radio part (11) of the unit (20), and filters the received second signals to a second radio part (12) of the unit (20), and a second filter (16) in the antennas, for example, which filter combines at least the first signals and at least the second signals received and feeds them via the common coupling means (29, 26) to the unit (20), filters the first signals to the transmitted to first external antenna (14), and filters the second signals to be transmitted to a second external antenna (15).

24 Claims, 2 Drawing Sheets

Figure 1:
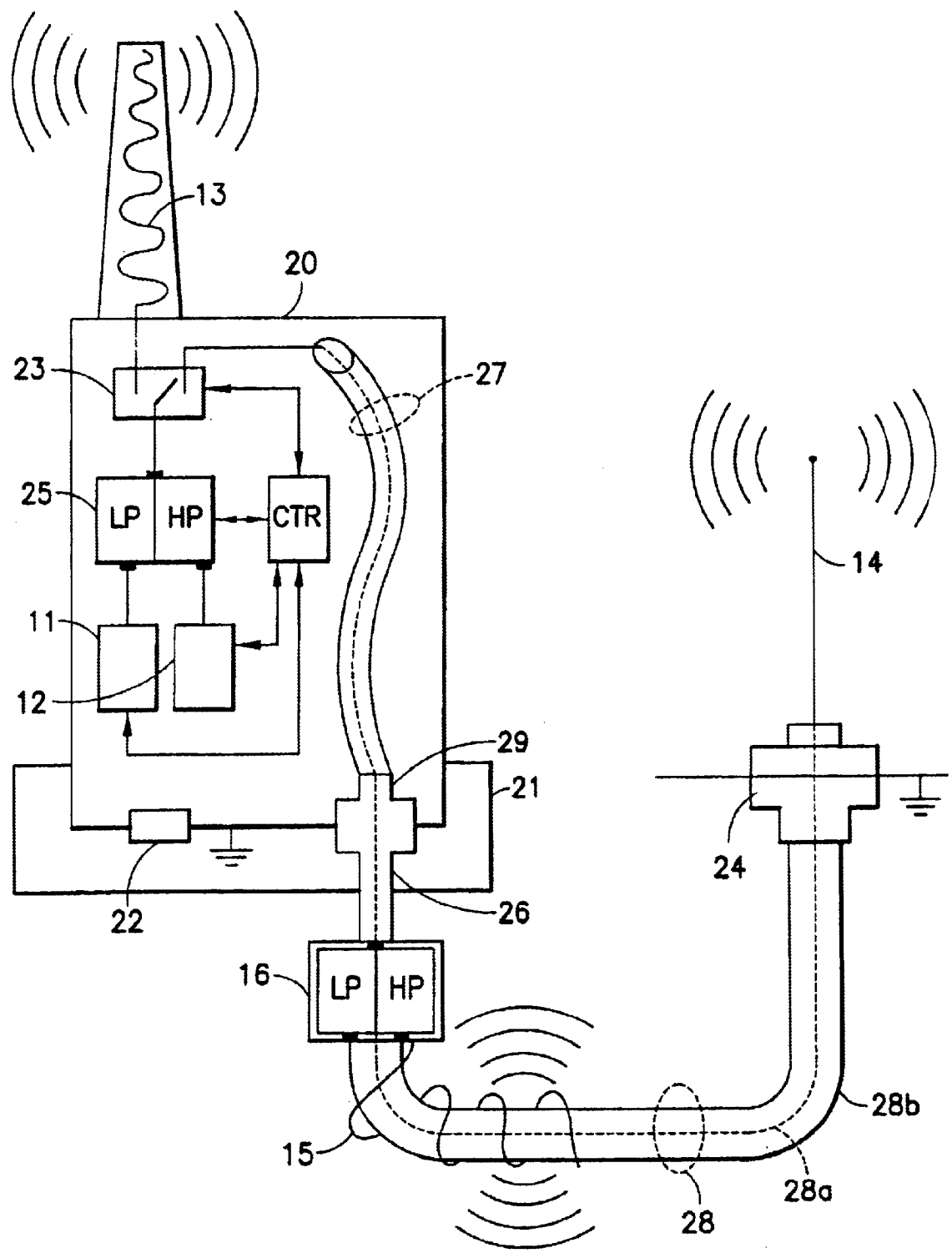

METHOD AND ANTENNA ARRANGEMENT FOR COUPLING EXTERNAL ANTENNAS TO A COMMUNICATION UNIT

CROSS-REFERENCES TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates to a method for coupling external antennas to a communications unit. The invention also relates to an arrangement for coupling external antennas to a communication unit. The invention also relates to an antenna arrangement for coupling external antennas to a communication unit, which is arranged for establishing a first and a second mobile communication connection. The invention also relates to a communication unit, which is arranged for establishing a first and a second mobile communication connection.

2. Description of the Related Art Including Information Disclosed Under 37 CFR 1.97 and 1.98

There are various mobile communication means known today, such as mobile stations, which enable having a mobile communication connection to a data transfer network, for example a Public Land Mobile Network (PLMN) according to the GSM specifications, generally via a base station serving a cell of the network. Antennas installed as fixed in these devices are used for sending and receiving radio frequency signals. The frequency range of mobile stations, e.g. the frequency range available in some GSM networks comprises the range 880–960 MHz. The frequency range available for modern mobile communication means, such as mobile stations, which use multiple frequency ranges, can also comprise the range 1710–1880 MHz (so-called DCS or PCN) or the range 1850–1990 MHz (so-called DCS or PCS). Two-way, independent data transfer is usually possible in each frequency range.

Various electronic devices, such as portable personal computers (PC) are often provided with an extension card connection, to the slot of which an extension card according to the standard can be connected. A known extension card is the PC card according to the PCMCIA (Personal Computer Memory Card International Association) standard. These extension cards form a functional entity with a PC. The extension cards can also contain radio parts with antennas, whereby the cards constitute a communication unit for mobile communication, a mobile station. Thus a PC can be connected to a data transfer network, such as a GSM network, by means of this card unit. The unit can also be intended for forming a Wireless Local Area Network (WLAN), whereby the unit is directly connected to other devices or a local area network via an Access Point, for example. In a local area network of devices and communication units, which is arranged for a data transfer connection of Low Power Radio Frequency (LPRF) or Short Range Radio Frequency (SDRF), the frequency range available comprises the range 2.4–2.5 GHz, i.e. 2400–2500 MHz.

The communication units mentioned above often also include coupling means for connecting an external antenna to the unit. This is often realized by using connectors, such as a coaxial connector or a BNC connector (Baby N Connector), and a flexible coaxial cable. An external antenna can be located on the outside of a vehicle, for instance, while the unit is used inside the vehicle. Thus the antenna is located in a free space, whereby the body of the vehicle causes less disturbance to the radiation pattern of the antenna. The body of a vehicle disturbs the operation of the fixed antenna of a unit located inside the body, whereby the operation radius of the antenna is often decreased considerably. The mobile station also has a fixed, protruding antenna, but the antenna switch in the device automatically detects the coupling of an external antenna and switches the fixed antenna off. It is also advantageous to locate the antenna of the card unit further from electronic devices causing electromagnetic interference, such as PC devices. An external antenna can then be coupled to the units via a cable. The antenna can be, for example, a monopole antenna, a helix antenna, a microstrip antenna or a so-called PIFA antenna (Planar Inverted F Antenna).

It is also common that an antenna intended for a local area network, which also has a smaller radius of operation, is integrated into the communication unit. Small-sized strip antennas and PIFA antennas are especially suitable for integration, generally as disposed on the circuit board of the card. Units that can be used both in a mobile communication network and a wireless local area network are also being developed. In such a construction, separate radio parts are placed in the unit, including transceivers for different networks and separate fixed antennas for processing signals of different strength and different frequency ranges.

The radiating antenna creates an electromagnetic field around it, by means of which it is coupled to other antennas, particularly intensely at a close distance from the antenna. When the size of communication units decreases, the problem becomes more pronounced, because it is not possible to increase the distance between the antennas. Often the way of using the communication unit or its design considerations, especially if it is a card unit, force the antennas to be located in a certain place and close to each other. The coupling causes spurious frequencies to be formed and carried to a transceiver coupled to an antenna, thus interfering with data transfer and its reliability. Spurious frequencies also radiate outwards, interfering with other devices as well.

SUMMARY OF THE INVENTION

It is an object of this invention to enable reliable operation of the radio parts by electrically separating the transceivers more efficiently from each other. Another object is to enable the use of a common antenna structure, whereby the problems of finding suitable places and enough space for separate antennas are avoided. A further object is the use of common coupling means and a common connector for the external antennas of the communication unit. A still further object is an external antenna construction, which enables both connections to a mobile communication network and the extension of the operation range of the antenna of the local area network or securing operation in variable conditions. The arrangement for an external antenna is an integrated, simple and easy-to-use construction, which is coupled to the unit via one connector. At the same time, the antennas are efficiently separated electrically from each other.

By means of an integrated antenna structure, the antenna of a local area network can be kept close to the unit, whereby it is especially suitable for use in vehicles. Then, for example, a GSM antenna can be located outside the vehicle, but an LPRF antenna is inside the vehicle, whereby the auxiliary devices inside maintain the connection to the unit reliably. By means of the antenna arrangement, it is also possible to couple a high-gain directional antenna to the unit, whereby the operation radius of the local area network can be increased. There is also the advantage that the operation of an LPRF antenna integrated into the cable of an external GSM antenna is often more efficient than that of antennas located in small units, because the space, position and body of the unit have an effect on the radiation pattern, for example.

BRIEF DESCRIPTION OF THE DRAWINGS(S)

Figure 2:
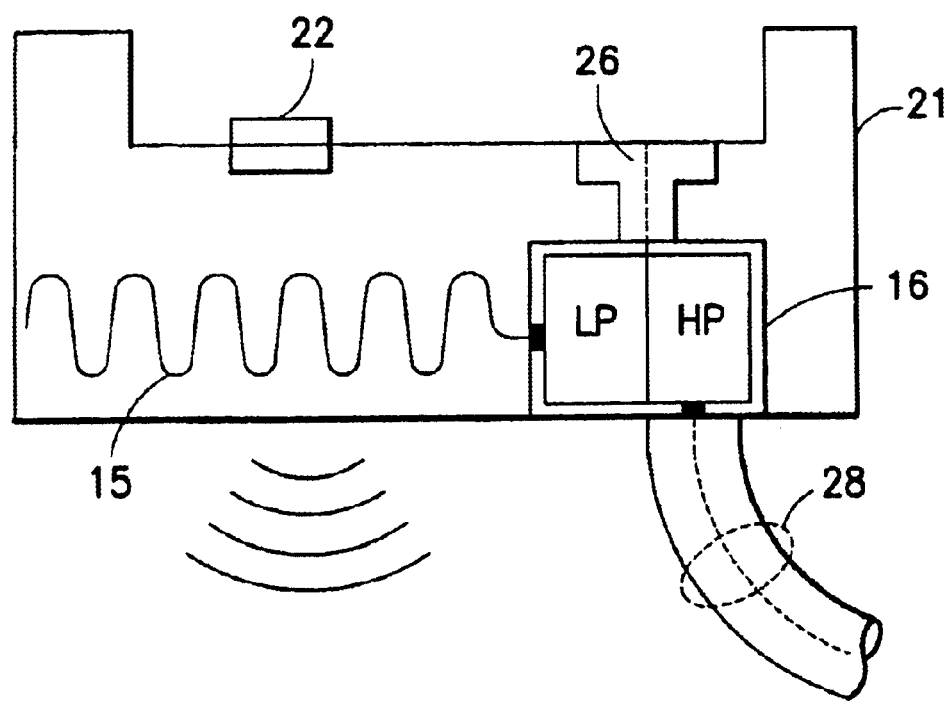

In the following, the invention will be described in more detail with reference to the accompanying drawings, in which FIG. 1 illustrates the principle of a communication unit and an antenna arrangement according to a preferred embodiment of the invention, and FIG. 2 illustrates the principle of an antenna arrangement according to another preferred embodiment of the invention.

DETAILED DESCRIPTION OF THE INVENTION

FIG. 1 shows an arrangement according to a preferred embodiment of the invention for coupling external antennas to a communication unit 20, especially a mobile station 20, which is attached to a holder 21. The holder 21 is used especially in vehicles for keeping the unit 20 readily at hand and generally also for charging the batteries. The holder 21 is arranged for coupling the unit 20 easily to an external antenna 14, which is normally located outside the vehicle. The unit 20 detects the attachment to the holder 21 by means of a terminal block 22, for example, which matches with the corresponding contacts of the holder 21. The antenna switch 23 switches off the fixed antenna 13, which is fastened to the unit 20. At the same time, the antenna switch 23 switches the diplex filter 25 electrically to external antennas 14 and 15 via coaxial cables 27 and 28 for processing electromagnetic signals of different frequency ranges. In a manner known as such, information is transferred in a data transfer connection by means of signals, generally as coded, which information is interpreted in the parts controlling the operations of the unit 20 in a manner known as such. The cable 27 is located inside the unit 20, and it is an example of forming a connection to the connector 29. The unit 20 is controlled by its control unit CTR, which monitors the switching of the terminal block 21, for example, and controls the operation of the antenna switch 23. The control unit CTR consists of a microcontroller unit (MCU) and an application specific integrated circuit (ASIC), for example, and it is also connected to the control blocks controlling other operations of the unit 20 for controlling the switching, reception and transmission functions, input/output (I/O) functions and radio parts, for example. Other operation of the unit 20, more detailed construction and operation of the radio parts and controlling for processing the antenna signals, for example, is known as such, and a more detailed description thereof is not necessary.

The fixed antenna 13 is intended for receiving and sending the signals of the first frequency range, e.g. the GSM frequency range, which signals are processed in the first radio part 11. The first external antenna 14 is alternatively arranged for receiving and sending of the first signals. In the embodiment described, the fixed antenna 13 is also intended for receiving and sending signals of another frequency range, such as the LPRF frequency range. When the unit 20 includes a diplex filter 25, the fixed antenna 13, which is, for example, a helix antenna, can be used for sending and receiving of signals of different frequency ranges. Alternatively, the unit 20 can be provided with a fixed internal antenna (not shown in the figure), which is intended for receiving and sending of signals of the LPRF frequency range, for example, or the second frequency range, which signals are processed in the second radio part 12. In the arrangement described above, this internal antenna can be replaced by another, external antenna 15. The external antenna 15 is alternatively arranged for receiving and sending of the second signals. In the embodiment described above, the antenna 14 is a monopole antenna, which is fastened to its place of installation and comprises the necessary connector means 24, such as a coaxial connector, for coupling the inner conductor 28a of the coaxial cable 28 electrically to the antenna 14. The body of a vehicle can function as the ground potential of the monopole antenna 14, and it is coupled to the outer sheath 28b of the cable.

According to a preferred embodiment of the invention, the first radio part 11 is a GSM module, whereby the frequency range of the first signals comprises, for example, the frequency range 880–960 MHz and generally also part of the frequency range 1710–1990 MHz. According to a preferred embodiment of the invention, the second radio module 12 is an LPRF module, whereby the frequency range of the second signals comprises at least part of the frequency range 2400–2500 MHz. The unit 20 can also comprise an internal antenna for processing the second signals. Inside the unit 20, the number and location of the antenna switches can vary depending on which external antennas are coupled to the connector 29. In an embodiment of the invention, only the antenna 14 (or only the antenna 15) is coupled to the unit by means of an antenna arrangement, whereby the antenna 13 (or an internal antenna) must also be used for processing the second signals. Different situations must also be recognized and the antenna switches controlled for them. In the embodiment according to FIG. 1, both external antennas 14 and 15 are coupled to the unit 20. A common feature of different combinations is the fact that the signals of the frequency ranges from the unit 20 are combined to common connector means, when required, i.e. to the connector 26 and further to the antenna arrangement for transmission. The antenna arrangement can also transmit the received signals as combined from the external antennas 14 and 15 to the connector 29. The antennas are generally also provided with a matching circuit for matching the antenna with the rest of the electrical circuit for the transfer of signals and for matching the impedances.

The diplex filter 25 constituting the required filter means includes, for example, a low-pass filter and a high-pass filter, which divide the frequency range available into two separate, preferably non-overlapping frequency ranges. Alternatively, the diplex filter can include a band-reject filter and a band-pass filter. The required functions can also be implemented by means of different combinations of the filters. One of them includes the first signals (e.g. the GSM frequency range) and the other includes the second signals (e.g. the LPRF frequency range). The signals of these frequency ranges can thus be separated from each other and processed separately. The diplex filter also allows feeding the first and the second signals to a common cable, thereby enabling independent data transfer on both frequency ranges. The diplex filter connects different signals to the frequency range available.

The coupling means used is a small-sized coaxial connector 29 fastened to the unit 20 and a coaxial connector 26 fastened to the holder 21. The ground contact from the unit 20 to the antenna 14 is formed by means of the outer sheath 28b of the coaxial cable 28. Grounding is done for protecting the signals running in the inner conductor 28a from electromagnetic interference. There is dielectric material between the outer sheath and the inner conductor in the coaxial cable, and the outer surface of the cable is also protected with rubber or plastic, for example. The body of the unit 20 has a certain ground potential, which is utilized, and certain external antennas also require the association of the ground potential of the unit 20 to the antenna. The ground potential and the signals are coupled electrically by means of coaxial connectors 29 and 26, which are, for example, so-called BNC connectors and comprise a central conductor and an outer shroud. Signals are transmitted to the antenna 14 by means of the inner conductor 28a of the cable 28.

In the antenna arrangement according to FIG. 1, the second external antenna 15 is integrated into the coaxial cable 28, whereby it is possible to couple simultaneously and by means of one connector 29 both external antennas 14 and 15 to the unit 20. The more exact manner and point of integration of the second antenna 15 can vary as desired, but the antenna 15 must be protected and separated electrically from the inner conductor 28a. When required, the ground contact 28b can be used for coupling the ground potential to the antenna 15. The antenna 15 must also be protected with an insulating covering or sheath from mechanical wear, for instance, and located so that signal transmission and reception is possible. Preferably the antenna 15 is located in the cable 28 in the vicinity of the unit 20 and the holder 21. Then, especially in vehicle applications, the antenna 15 is located in the part of the cable 28, which is inside the vehicle, where the other auxiliary devices also are. Data transfer connection to these auxiliary devices is created by means of the antenna 15.

Filter means 16 are arranged in connection with the cable 28, comprising the required diplex filter, the principle of which has been described earlier. The purpose of the filter means 16 is to separate the first signals (GSM frequency range) by filtering from the second signals (LPRF frequency range) for feeding to the antenna 14. The purpose is also to separate the second signals (LPRF frequency range) by filtering from the first signals (GSM frequency range) for feeding to the antenna 15. The signals are transmitted further wirelessly by means of radio signals. Each frequency range enables independent, two-way data transfer. The diplex filter 16 also combines the signals received by the antennas 14 and 15 to be fed to the common conductor and further to the connector 29 of the unit 20. The first antenna 14 is connected to the low-pass filter part of the diplex filter, and the second antenna 15 is connected to the high-pass part.

The filter means 16 can also be formed as a separate block, which is coupled by means of connectors to the cable 28 and the holder 21, e.g. to the connector 26. The common conductor can be formed with a jumper cable, which is coupled to the filter means 16 and the holder 21 by means of connectors, for example. Then the location of the filter block on the length of the cable 28 can be varied. It is also possible to locate the antenna 15 in the separate filter block, whereby it need not be integrated into the cable 28. In addition to this, the separate block can be provided with a connector, to which an antenna of the desired type, such as a directional, separate external antenna corresponding to the antenna 15, can be fastened. Then the antenna 15 need not be integrated into the cable 28 or the separate block. The antenna can be, for example, a PIFA, IFA, helix or wire antenna. It is also clear that the cable 28 and the separate block can also be connected to the unit 20 directly, without the holder 21, whereby the connector 26 is fastened to the jumper cable, the separate block or the filter means 16. It is also clear that the filter means, as a separate block, for example, can also be located in connection with the connector means 24. The filter means can also be arranged according to the invention when at least the second external antenna is arranged for transmission or reception only. In that case, only combining or only filtering may be necessary in each filter means.

FIG. 2 shows another preferred embodiment of the invention, in which the filter means 16 are integrated into the holder 21. In addition to this, the second external antenna 15 is located in the holder 21, whereby it need not be integrated into the cable 28, which can also be coupled to the holder by means of a connector. The required electrical couplings have been arranged in the holder 21 for transmitting signals. Required electrical control circuits and matching circuits for antennas can also be arranged in the holder 21. According to a preferred embodiment of the antenna arrangement, the antenna holder 21 is provided with a connector, for example, to which the separate external antenna 15 is connected. The antenna 15 can thus be varied and it need not be integrated into the holder 21.

With regard to the co-functionality of the antenna arrangement and the unit 20 it is necessary that the first and the second signals are separated from each other also in the unit 20. Likewise, it is necessary to couple the signals to the same coupling means, such as a connector 29. This is done according to FIG. 1 by means of an internal diplex filter in the unit 20. The purpose of the diplex filter 25 is to separate the first signals (GSM frequency range) from the received signals by filtering for feeding to the radio module 11 (GSM module) and to separate the second signals (LPRF frequency range) from the received signals for feeding to the radio module 12 (LPRF module). The low-frequency module (e.g.GSM module) is connected to the low-pass part of the filter 25 and the high-frequency module (e.g. LPRF module) is connected to the high-pass part. On the other hand, the signals coming from the radio parts are connected with a diplex filter 25 to a common conductor, e.g. to the connector 29. When no external antennas are coupled to the unit 20, the first signals are received from the antenna 13 and the second signals are received from an internal antenna, for example, which signals are brought to be connected to the diplex filter 25.

The antenna arrangement according to the invention can also be applied in connection with communication units in the form of cards. With reference to FIG. 1, the unit 20 can be formed as a card, and, for instance, an extended card according to the PCMCIA standard. The normal length of a PCMCIA card is 85.6 mm and the width 54 mm. The cards are divided into three types, whereby the thickness of the card can be 3.3 mm (type I), 5.0 mm (type II) or 10.5 mm (type III. The extended cards are located partly outside the slot of the extension card connection, and the thickness and shaping of the card can vary in the portion which remains outside. An extended card can be 40 mm longer than the normal length. The portion mentioned above can be formed as an antenna module with the antenna 13 of the unit 20 also located in it, the antenna being, for instance, a radiating helix antenna.

The antenna module of the card unit 20 is preferably arranged as changeable. The antenna module is connected to the card with coupling means, whereby, according to the invention, it can also be replaced by an antenna arrangement, which enables coupling a first and a second external antenna to the card unit 20. Then the connector 29, cable 27 and antenna switch 23 shown in FIG. 1 can also be omitted from the unit 20. In the above description, the holder 21 corresponds to the changeable antenna module in this embodiment, and the connector 26 is arranged in the coupling means of the card. The models of the connectors and coupling means can vary, but they all have the purpose of transmitting combined signals between the unit and the antenna arrangement. A changeable antenna module can also be arranged in mobile stations in place of a fixed antenna 13.

The unit 20 can also be arranged so that it does not contain a second internal antenna for the signals of the second frequency range. In order to receive these signals, an external antenna 15 must always be coupled to the unit 20 by means of an antenna arrangement like the one described above. Thereby the unit 20 can be used to establish a data transfer connection to at least the GSM network. In order to form a local area network, such as an LPRF network, the unit 20 is connected to a holder, device or arrangement, which comprises an antenna arrangement according to the invention, to which the external antennas 14 and 15 are coupled. At least part of the coupling means, such as the connector means 24, can be arranged as fixed, whereby it is not possible to open the coupling. However, it is preferred that the coupling can be opened and closed for coupling separate parts to each other and for changing the parts for different purposes.

It is clear that the invention is not limited to the preferred embodiments of the invention described above, but it can vary within the scope of the attached claims. In the above description, the GSM network and the LPRF network and their frequency ranges have been used as examples, but the invention can also be applied in other corresponding networks.

What is claimed is:

1. A method for coupling external antennas to a communication unit, comprising:

transmitting a combined signal of signals of at least a first frequency range and a second frequency range between the unit and first and second external antenna means, wherein the first external antenna means are arranged for at least sending these first frequency range signals, and which first frequency range is reserved for a first wireless data transfer connection, and wherein the second antenna means are arranged for at least sending these second frequency range signals, and which second frequency range is reserved for a second wireless data transfer connection, combining the signals of at least the first frequency range and the signals of at least the second frequency range for feeding them as the combined signal from the unit via common coupling means to the external antennas, and filtering the first frequency range signals from the combined signal received from the unit via said common coupling means, for feeding said first frequency range signals to the first external antenna means, and filtering the second frequency range signals from the combined signal, received from the unit via said common coupling means, for feeding said second frequency range signals to the second external antenna means.

2. A method for coupling external antennas to a communication unit, comprising:

transmitting a combined signal of signals of at least a first frequency range and a second frequency range between the unit and first and second external antenna means, wherein the first external antenna means are arranged for at least receiving these first frequency range signals, and which first frequency range is reserved for a first wireless data transfer connection, and wherein the second antenna means are arranged for at least receiving these second frequency range signals, and which second frequency range is reserved for a second wireless data transfer connection, combining the signals of at least the first frequency range and the signals of at least the second frequency range received with the external antennas for feeding them as the combined signal via common coupling means to the unit, and filtering the first frequency range signals from the combined signal, received from the external antennas via said common coupling means, for feeding said first frequency range signals to the first radio part of the unit, which first radio part is arranged for processing these first frequency range signals, and filtering the second frequency range signals from the combined signal, received from the external antennas via said common coupling means, for feeding said second frequency range signals to the second radio part of the unit, which radio part is arranged for processing these signals.

3. An arrangement for coupling external antennas to a communication unit and for transmitting signals between the communication unit and the external antennas, comprising:

means by which a combined signal of signals of at least a first frequency range and a second frequency range is transmitted between the unit and first and second external antenna means, wherein the first frequency range is reserved for a first wireless data transfer connection, and wherein the second frequency range is reserved for a second wireless data transfer connection, and wherein said means comprise common coupling means for transmitting said combined signal between the unit and the external antenna means, first filter means, which are arranged for combining at least the first frequency range signals and at least the second frequency range signals and for feeding them as the combined signal via said common coupling means to the external antennas, wherein the first filter means are also arranged for filtering the first frequency range signals from the combined signal, received via said common coupling means, for feeding said first frequency range signals to the first radio part of the unit, which radio part is arranged for processing these first frequency range signals, and wherein the first filter means are also arranged for filtering the second frequency range signals from the combined signal, received via said common coupling means, for feeding said second frequency range signals to the second radio part of the unit, which radio part is arranged for processing these second frequency range signals, and second filter means, which are arranged for combining at least the first frequency range signals, received with the first external antenna means, and at least the second frequency range signals, received with the second external antenna means, and for feeding them as the combined signal via said common coupling means to the unit, wherein the second filter means are also arranged for filtering the first frequency range signals from the combined signal, received via said common coupling means, for feeding said first frequency range signals to the first external antenna means, and for filtering the second frequency range signals from the combined signal, received via said common coupling means, for feeding said second frequency range signals to the second external antenna means.

4. The arrangement according to claim 3, wherein the first filter means and at least a part of the common coupling means are located in the unit.

5. An antenna arrangement for coupling external antennas to a communication unit, which is arranged for establishing a first and a second wireless data transfer connection, the antenna arrangement comprising at least:

means for coupling first external antenna means to the antenna arrangement, wherein said first external antenna means are arranged for signals of a first frequency range, which is reserved for a first wireless data transfer connection, and first connector means for coupling the antenna arrangement to the unit, wherein said first connector means are arranged for transmitting a combined signal of at least said first frequency range signals and second signals of a second frequency range between the antenna arrangement and the unit, which second frequency range is reserved for a second wireless data transfer connection, and filter means, which are arranged for combining at least the first frequency range signals and at least the second frequency range signals for feeding them as a combined signal to the unit via said first connector means, and/or which filter means are arranged for filtering at least the first frequency range signals and at least the second frequency range signals from the combined signal, received from the unit via said first connector means, for feeding said first frequency range signals to said external antenna means and for feeding said second frequency range signals to second external antenna means, which are arranged for the second signals.

6. The antenna arrangement according to claim 5, wherein it also comprises cable means for coupling the first external antenna means to the antenna arrangement, and wherein the second external antenna means are integrated into said cable means.

7. The antenna arrangement according to claim 5, wherein it is formed as a holder in which the unit is arranged to be placed, and wherein the filter means and the second external antenna means are integrated into said holder.

8. A communication unit, which is arranged for establishing a first and a second wireless data transfer connection, comprising:

first radio parts for processing signals of a first frequency range, which is reserved for a first wireless data transfer connection, second radio parts for processing signals of a second frequency range, which is reserved for a second wireless data transfer connection, connector means for coupling first external antenna means to the unit, which antenna means are arranged for the first signals, and which connector means are arranged for transmitting at least the first signals between the first external antenna means and the first radio parts, wherein the connector means are also arranged for transmitting said second signals between second external antenna means and the second radio parts, which, antenna means are for the second signals, first filter means, which are arranged for combining at least the first and at least the second signals for feeding them to the connector means, and/or which first filter means are arranged for filtering at least the first and at least the second signals from each other for feeding them to said radio parts, and a changeable antenna module, which is arranged to be coupled to the connector means, and which comprises second filter means, which are arranged for combining at least the first signals and at least the second signals for feeding them to the connector means, and/or which second filter means are arranged for filtering the first and at least the second signals from each other for feeding them to the external antenna means.

9. The communication unit according to claim 8, wherein the changeable antenna module is also provided with the second external antenna means.

10. The communication unit according to claim 8, wherein the changeable antenna module is formed as a holder in which the communication unit is arranged to be placed.

11. The communication unit according to claim 8, wherein the first and the second filter means include a diplex filter.

12. The communication unit according to claim 8, wherein the unit also comprises fixed antenna means and it is arranged to couple electrically said first filter means instead of the fixed antenna means to the connector means, when the changeable antenna module is coupled to said connector means.

13. The communication unit according to claim 9, wherein the changeable antenna module is formed as a holder in which the communication unit is arranged to be placed.

14. The communication unit according to claim 9, wherein the first and the second filter means include a diplex filter.

15. The communication unit according to claim 10, wherein the first and the second filter means include a diplex filter.

16. The communication unit according to claim 9, wherein the unit also comprises fixed antenna means and it is arranged to couple electrically said first filter means instead of the fixed antenna means to the connector means, when the changeable antenna module is coupled to said connector means.

17. The communication unit according to claim 10, wherein the unit also comprises fixed antenna means and it is arranged to couple electrically said first filter means instead of the fixed antenna means to the connector means, when the changeable antenna module is coupled to said connector means.

18. The communication unit according to claim 11, wherein the unit also comprises fixed antenna means and it is arranged to couple electrically said first filter means instead of the fixed antenna means to the connector means, when the changeable antenna module is coupled to said connector means.

19. The arrangement according to claim 3, wherein the common coupling means comprise a coaxial connector fastened to the unit.

20. The antenna arrangement according to claim 6, wherein the cable means are arranged for placing the first external antenna means outside a vehicle and for placing the second external antenna means inside the vehicle.

21. The antenna arrangement according to claim 20, wherein the second external antenna means are located in the vicinity of the unit.

22. The antenna arrangement according to claim 20, wherein it is formed as a holder in which the unit is arranged to be placed, and wherein the second external antenna means are located in the vicinity of the unit.

23. The antenna arrangement according to claim 7, wherein it also comprises coaxial cable means for coupling the first external antenna means to the antenna arrangement.

24. The antenna arrangement according to claim 23, wherein the coaxial cable means are also for placing the first external antenna means outside a vehicle.

* * * * *